Nov. 27, 1951      F. W. TRUMBULL      2,576,490

ACCOUNTING SHEET

Filed March 20, 1950

Patented Nov. 27, 1951

2,576,490

UNITED STATES PATENT OFFICE 2,576,490

ACCOUNTING SHEET

Fred W. Trumbull, Los Altos, Calif.

Application March 20, 1950, Serial No. 150,726

1 Claim. (Cl. 283—66)

The present invention relates to an improved accounting form or sheet.

The accounting or book-keeping form comprising the present invention embodies a foldable sheet having a detachable portion which is adapted to be removed to provide an opening for exposing certain portions of the sheet's rear side for viewing or photographic purposes. The sheet is formed with prearranged crease lines which make it possible to fold the sheet in such a manner that only certain portions of the sheet's rear side are visible through the opening. The sheet is also preferably provided with a vertically aligned row of spaced pin receiving holes which afford means for maintaining a number of such sheets in spread relationship so that corresponding portions thereof are exposed for simultaneous viewing or photographing.

The primary object of the present invention is to provide a novel accounting sheet or form of the kind characterized, which, by reason of its novel construction and the arrangement of the printed material thereon, is adapted to simplify accounting methods and afford means for readily giving pertinent information about an account without the necessity of maintaining extensive records.

For the purpose of this application I have elected to show herein certain forms and details of an accounting sheet or form representative of my invention. It is to be understood, however, that the embodiment of my invention herein shown and described is for the purpose of illustration only, and that therefore it is not to be regarded as exhaustive of the variations of the invention.

In the accompanying drawings:

Fig. 1 is a plan view of the front side of an accounting sheet or form embodying my invention;

Fig. 2 shows the sheet with the upper portion folded downwardly in a superimposed position upon the lower portion; and Fig. 3 is a plan view of the rear side of the sheet.

Referring to the drawings the numeral 1 designates a paper sheet of substantially rectangular shape having a number of widely spaced holes 2 arranged near its left hand edge or end for attaching the sheet to a suitable supporting device. The sheet is also provided with a vertical row of closely spaced holes 3 which are adapted for use in supporting the sheet and others like it in spread formation on a number of pegs, pins or the like.

The front side of the sheet 1 is divided by suitably arranged horizontal and vertical printed lines into a number of areas wherein figures and letters concerning a certain account or accounts are adapted to be written. The front side of the sheet is also marked in various places with printed words, letters or characters used to indicate where different book-keeping entries are to be made. The sheet 1 is preferably, although not necessarily, used to receive carbon impressions made by the making of original entries on a similar sheet which is superimposed thereon. The sheet 1 at its left hand edge or end is preferably formed with an indentation 4 that provides a finger opening which permits the grasping of only the upper or original sheet when the two sheets are to be detached one from the other.

Extending in horizontal parallel relationship above and below the notation "Pay Exactly" are two fold lines 5 and 6 which provide guide means for folding the sheet lengthwise so that the upper portion may be folded downwardly upon the lower portion or the lower portion may be folded upwardly upon the upper portion. Corresponding portions of the fold lines 5 and 6 at points between their ends and adjacent two pin or peg receiving openings 7 are intermittently cut through, perforated or otherwise treated to provide lines of weakness 5' and 6' which permit the easy detachment of a strip 8 from the adjacent upper and lower portions of the sheet. The material of the sheet at the ends of the strip 8 is formed with small perforations or elongated cuts which together with the lines of weakness 5' and 6' make it possible to entirely detach the said strip from the sheet. Until detachment the strip forms an integral portion of the sheet. In ordinary practice the strip 8 is detached from the main body of one or a number of the sheets by suitable means such as a pair of fixed pegs inserted through the openings 7. After the detachment of the strip 8 from the main body of the sheet 1 an elongated opening 9 is provided horizontally in the said sheet. By folding the sheet 1 downwardly along the fold line 6 the upper portion of the said sheet is superimposed upon the lower portion, thereby exposing the rear side of the said upper portion and that part of the lower portion which appears through the opening 9. Thus the name of the account, which for illustration purposes is designated as "John Doe," appearing on the front side of the sheet directly beneath the opening 9 may be exposed for photographic or viewing purposes in association with certain data on the rear side of said sheet. Similarly the sheet may be folded upwardly along the fold line 5 to permit the lower rear side of the sheet to be exposed in conjunction with certain data of the account appearing on the front side of the said sheet. The holes 3 are so arranged that certain of them are brought into registry with others when the sheet is folded in the manner above described, thereby making it possible for the said folded sheet together with others like it to be mounted on suitable pegs or pins in partially superimposed positions for simultaneous viewing or photographing.

It is to be understood that the printed matter appearing on the sheet may be changed in accordance with various requirements concerning the maintenance of business records or accounts without departing from the spirit of the present invention.

What I claim is:

An accounting sheet comprising a substantially rectangular foldable sheet having printed forms on its front and rear sides and a vertical row of spaced pin receiving holes adjacent an end thereof, a detachable elongated strip forming an integral portion of the sheet and having its ends spaced inwardly from the opposite ends of the sheet, the said strip being bounded at its opposite elongated edges by longitudinal rows of perforations, the said strip when detached from the sheet forming an elongated opening in the sheet, and a fold line formed in the sheet, the said fold line being an extension of one of the rows of perforations, whereby a certain portion of one of the printed forms on the sheet will be visible through the elongated opening when the sheet is folded along the fold line.

FRED W. TRUMBULL.

REFERENCES CITED

The following references are of record in the file of this patent:

UNITED STATES PATENTS

| Number | Name | Date |
|---|---|---|
| 570,249 | Elkin | Oct. 27, 1896 |
| 932,851 | Gallagher | Aug. 31, 1909 |
| 1,313,944 | Franks | Aug. 26, 1919 |
| 1,635,357 | Bemis | July 12, 1927 |
| 2,262,277 | Godley | Nov. 11, 1941 |